Patented July 7, 1936

2,046,835

UNITED STATES PATENT OFFICE 2,046,835

ACID DYESTUFFS OF THE ANTHRAQUINONE SERIES

Paul Nawiasky and Robert Zell, Ludwigshafen-on-the-Rhine, and Walther Kuehne, Mannheim, Germany, assignors to General Aniline Works, Inc., New York, N. Y., a corporation of Delaware No Drawing. Application January 23, 1935, Serial No. 3,186. In Germany February 1, 1934

9 Claims. (Cl. 260—60)

The present invention relates to acid dyestuffs of the anthraquinone series.

We have found that valuable acid dyestuffs of the anthraquinone series are obtained by preparing compounds having the formula:

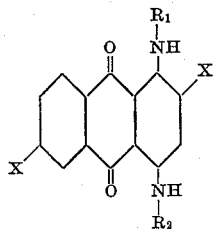

in which $R_1$ and $R_2$ are identical or different aryl radicals, one X is a carboxylic acid group esterified with an aliphatic alcohol of low molecular weight, the other X a hydrogen atom, and which contain one or more sulfonic acid groups in the anthraquinone radicle and/or in the substituents. The dyestuffs are especially suitable for dyeing wool and are distinguished by excellent properties as regards fastness and especially by a good levelling power.

The following examples will further illustrate how the said invention may be carried out in practice but the invention is not restricted to these examples. The parts are by weight.

Example 1

10 parts of 1,4-dichloroanthraquinone-2-carboxylic acid methyl ester (obtainable for example from 1-amino-2-methyl-4-chloroanthraquinone by diazotization, reaction of the resulting diazo compound with cuprous chloride according to Sandmeyer, oxidation of the resulting 1,4-dichlor-2-methylanthraquinone with pyrolusite in sulfuric acid and esterification), 100 parts of para-toluidine, 10 parts of anhydrous potassium acetate and 0.1 part of copper acetate are heated at 150° C. until no further change in the color of the reaction mixture towards green takes place. The whole is then allowed to cool to 100° C., diluted with methanol and the deposited green crystals are separated.

5 parts of the resulting 1,4-di-para-toluidino-anthraquinone-2-carboxylic acid methyl ester are dissolved in 50 parts of sulfuric acid monohydrate and treated at about 10° C. with fuming sulfuric acid containing 23 per cent of $SO_3$ until a sample of the product when worked up is completely soluble in water. The whole is then poured on to ice and the dyestuff formed is salted out in the usual manner.

The dyestuff dyes wool clear yellowish green shades of excellent properties as regards fastness from a weakly acid bath.

If the para-toluidine be replaced by aniline and the same procedure be followed, a dyestuff yielding somewhat more bluish dyeings is obtained. If the treatment with fuming sulfuric acid is carried out under more vigorous conditions as regards the strength of the fuming sulfuric acid and the reaction period, a dyestuff containing most probably two sulfonic acid groups in each of the anilido groups is obtained.

Example 2

10 parts of 1,4-dichloroanthraquinone-2-carboxylic acid methyl ester (prepared as described in Example 1), 100 parts of para-cyclohexylaniline, 8 parts of anhydrous sodium acetate and 0.1 part of copper acetate are heated at 150° C. until the color of a sample withdrawn and dissolved in pyridine no longer changes. The whole is then allowed to cool to 100° C., diluted with methanol and the crystals of 1,4-di-(para-cyclohexylanilino)-anthraquinone-2-carboxylic acid methyl ester obtained after cooling are separated.

5 parts of the resulting reaction product are dissolved in 50 parts of sulfuric acid monohydrate and treated at about 10° C. with fuming sulfuric acid containing 23 per cent of $SO_3$ until a sample withdrawn and worked up is completely soluble in water. The whole is then poured on to ice and the dyestuff is salted out in the usual manner.

The dyestuff dyes wool clear yellowish green shades of excellent fastness properties from a weakly acid bath.

Example 3

A mixture of 10 parts of 1,4-dichloranthraquinone-2-carboxylic acid methyl ester, 20 parts of aniline and 3 parts of anhydrous sodium acetate is heated while stirring at from 95° to 100° C. until the color of the melt no longer changes. After cooling, the melt is diluted with methanol and the crystals deposited are isolated in the usual manner.

A mixture of 5 parts of the 1-anilino-4-chloranthraquinone-2-carboxylic acid methyl ester thus obtained, 1.25 parts of anhydrous sodium acetate, 25 parts of para-toluidine and 0.2 part of copper acetate is heated at from 125° to 130° C. until the color of the melt no longer changes. After diluting the melt with methanol, the green needles formed are isolated in the usual manner.

5 parts of the 1-anilido-4-para-toluidinoanthraquinone-2-carboxylic acid methyl ester are introduced at from 5° to 8° C. into 50 parts of sulfuric acid monohydrate. As soon as the initial compound has been completely dissolved fuming sulfuric acid containing 23 per cent of $SO_3$ is added until a sample withdrawn has become readily soluble in water. The mixture is then poured on to ice and the dyestuff formed is salted out with common salt. It dyes wool green shades of good fastness properties also from weakly acid baths.

Example 4

A mixture of 50 parts of 1,4-dichloranthraquinone-2-carboxylic acid methyl ester, 150 parts of para-toluidine and 12.5 parts of anhydrous sodium acetate is heated at 110° C. while stirring until the color of the melt no longer changes. It is then diluted with methanol and the violet crystals formed are isolated in the usual manner.

A mixture of 32 parts of the 1-toluidino-4-chloranthraquinone-2-carboxylic acid methyl ester, 8 parts of anhydrous sodium acetate, 160 parts of aniline and 1.6 parts of copper acetate is heated at from 125° to 130° C. until the color of the melt no longer changes. After adding methanol, the green crystals formed are isolated in the usual manner.

10 parts of the 1-para-toluidino-4-anilinoanthraquinone-2-carboxylic acid methyl ester are dissolved at about 10° C. in 100 parts of fuming sulfuric acid containing 5 per cent of $SO_3$. The solution is stirred at the said temperature until a sample withdrawn has become readily soluble in water. The solution is then poured on to ice and the dyestuff formed is salted out with common salt. It dyes wool yellowish green shades from a weakly acid bath.

Example 5

A mixture of 10 parts of 1,4-dichloranthraquinone-6-carboxylic acid methyl ester (obtainable by heating 1.4-dichloranthraquinone-6-carboxylic acid with methanol in the presence of sulfuric acid), 150 parts of para-toluidine and little copper acetate is heated in the presence of anhydrous potassium acetate at about 140° C. until a sample withdrawn is free from chlorine. After adding 150 parts of butanol, the crystals formed are isolated in the usual manner.

10 parts of the 1,4-di-para-toluidinoanthraquinone-6-carboxylic acid methyl ester are dissolved at between 5° and 10° C. in 100 parts of fuming sulfuric acid containing 5 per cent of $SO_3$. Then fuming sulfuric acid containing 23 per cent of $SO_3$ is added until a sample withdrawn has become readily soluble in cold water. The mixture is then poured into 1000 parts of ice-cold water while stirring. The precipitate formed hereby is filtered off by suction and dissolved in about 200 parts of hot water. By salting out with common salt a dyestuff is obtained which dyes wool green shades of excellent fastness properties.

Instead of the methyl ester the ethyl ester of 1,4-dichloranthraquinone-6-carboxylic acid may be employed as starting material.

Example 6

A mixture of 33 parts of 1,4-dichloranthraquinone-6-carboxylic acid methyl ester, 300 parts of para-cyclohexyl-analine, 30 parts of anhydrous potassium acetate and 0.3 part of copper acetate is heated at from 140° to 145 C. until a sample withdrawn is free from chlorine. The mixture is then cooled to 120° C. and then 600 parts of hot butanol are added thereto. It is stirred until it has become cold. 1,4-di-para-cyclohexyl-anilinoanthraquinone-6-carboxylic acid methyl ester separates in the form of green leaflets which are isolated in the usual manner.

10 parts of the ester thus obtained are dissolved at about 5° C. in 150 parts of fuming sulfuric acid containing 10 per cent of $SO_3$. The solution is then stirred until a sample withdrawn has become readily soluble in water. It is then poured into about 1500 parts of ice-cold water. The precipitate formed is then recrystallized from hot water while adding a solution of common salt. The dyestuff obtained dyes wool from acid baths green shades of excellent fastness properties.

Example 7

10 parts of 1,4-di-para-toluidinoanthraquinone-6-carboxylic acid are dissolved at 20° C. in 75 parts of fuming sulfuric acid containing 5 per cent of $SO_3$. Fuming sulfuric acid containing 23 per cent of $SO_3$ is then added to the solution until a sample withdrawn has become readily soluble in water. The mixture is then poured into 500 parts of methanol and the whole is heated to boiling until the formation of the methyl ester is completed. The mixture is then poured into an ice-cold dilute solution of common salt while stirring. The precipitate formed is then filtered off by suction, washed with dilute solution of common salt until neutral and recrystallized from hot water while adding a solution of common salt. The dyestuff thus obtained is practically identical to that prepared according to Example 5.

What we claim is:

1. Acid dyestuffs of the anthraquinone series corresponding to the general formula:

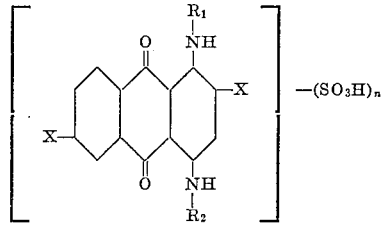

in which $R_1$ and $R_2$ stand for aryl radicals of the benzene series, one X for a carboxylic acid group esterified with an aliphatic alcohol of low molecular weight, the other X for hydrogen and $n$ for a whole number up to 4.

2. Acid dyestuffs of the anthraquinone series corresponding to the general formula:

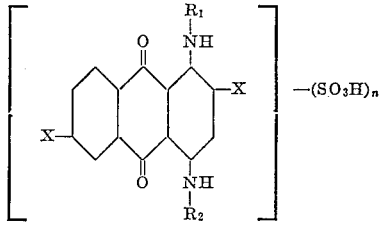

in which $R_1$ and $R_2$ stand for equal aryl radicles of the benzene series, one X for a carboxylic acid group esterified with an aliphatic alcohol of low molecular weight, the other X for hydrogen and $n$ for a whole number up to 4.

3. Acid dyestuffs of the anthraquinone series corresponding to the general formula:

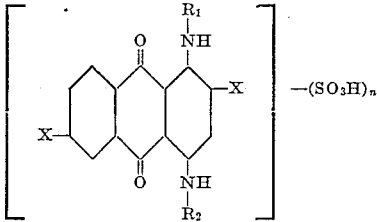

in which $R_1$ and $R_2$ stand for different aryl radicles of the benzene series, one X for a carboxylic acid group esterified with an aliphatic alcohol of low molecular weight, the other X for hydrogen and $n$ for a whole number up to 4.

4. Acid dyestuffs of the anthraquinone series corresponding to the general formula:

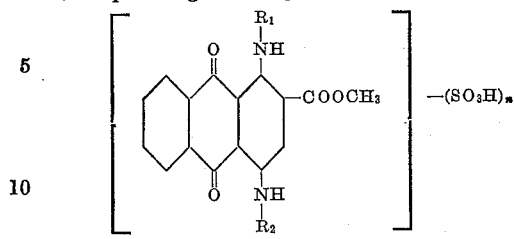

in which $R_1$ and $R_2$ stand for aryl radicles of the benzene series and $n$ for a whole number up to 4.

5. Acid dyestuffs of the anthraquinone series corresponding to the general formula:

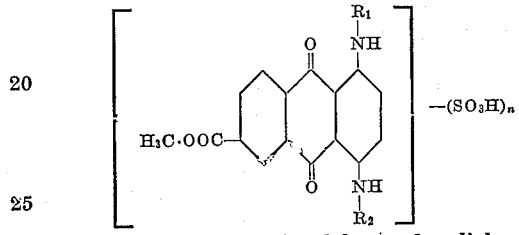

in which $R_1$ and $R_2$ stand for aryl radicles of the benzene series and $n$ for a whole number up to 4.

6. Acid dyestuffs of the anthraquinone series corresponding to the general formula:

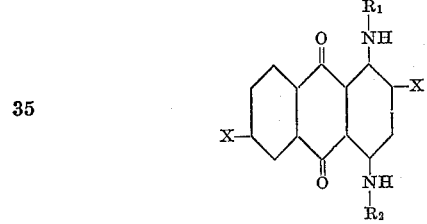

in which $R_1$ and $R_2$ stand for aryl radicles of the benzene series each of which contains up to two sulfonic acid groups, one X for a carboxylic acid group esterified with an aliphatic alcohol of low molecular weight and the other X for hydrogen.

7. The acid dyestuff of the anthraquinone series having the formula:

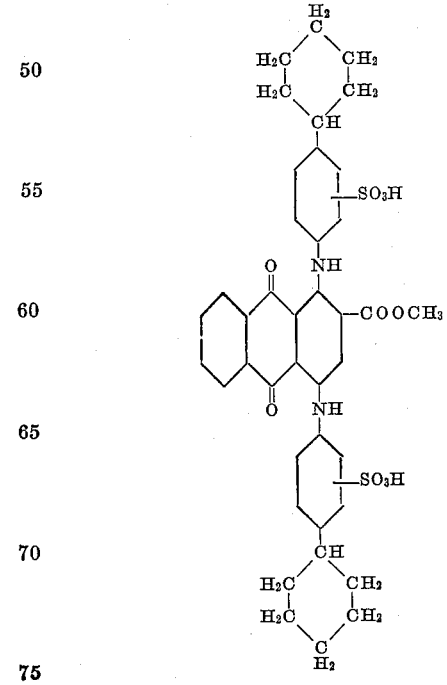

8. The acid dyestuff of the anthraquinone series having the formula:

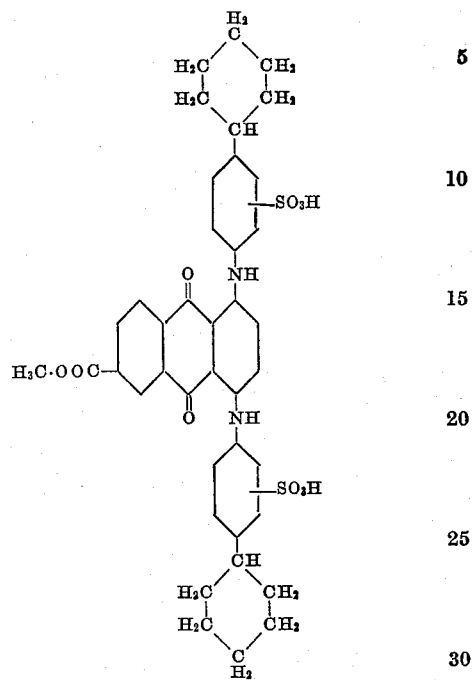

9. The acid dyestuff of the anthraquinone series having the formula:

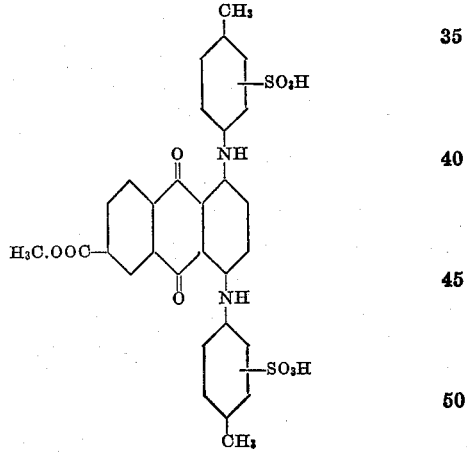

PAUL NAWIASKY.
ROBERT ZELL.
WALTHER KUEHNE.